United States Patent
Tian et al.

(10) Patent No.: US 12,406,024 B2
(45) Date of Patent: Sep. 2, 2025

(54) BALANCE WEIGHTED VOTING

(71) Applicant: INTERNATIONAL BUSINESS MACHINES CORPORATION, Armonk, NY (US)

(72) Inventors: Lei Tian, Xian (CN); Han Zhang, Xian (CN); Ning Zhang, Xian (CN); Xiao Li Zhang, Xian (CN); Yi Shao, Xian (CN); Jing Xu, Xian (CN); Xue Ying Zhang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 17/643,877

(22) Filed: Dec. 13, 2021

(65) Prior Publication Data
US 2023/0185882 A1 Jun. 15, 2023

(51) Int. Cl.
*G06F 18/21* (2023.01)
*G06N 20/20* (2019.01)

(52) U.S. Cl.
CPC ......... *G06F 18/2193* (2023.01); *G06N 20/20* (2019.01)

(58) Field of Classification Search
CPC ...... G06F 8/36; G06F 18/214; G06F 18/2193; G06F 18/254; G06N 3/08; G06N 20/20; H04L 7/01; H04L 67/34
See application file for complete search history.

(56) References Cited

U.S. PATENT DOCUMENTS

| | | | |
|---|---|---|---|
| 5,822,790 A * | 10/1998 | Mehrotra | G06F 12/0862 326/11 |
| 8,990,149 B2 | 3/2015 | Danciu | |
| 9,741,259 B2 * | 8/2017 | Mahmud | G09B 7/00 |
| 10,235,623 B2 * | 3/2019 | Lin | G06F 16/583 |
| 10,373,012 B2 * | 8/2019 | Jean | G06V 30/418 |
| 10,504,020 B2 * | 12/2019 | Trenholm | G06F 8/36 |
| 10,747,994 B2 * | 8/2020 | Sridharan | G06V 10/267 |

(Continued)

FOREIGN PATENT DOCUMENTS

CN 111723949 A 9/2020

OTHER PUBLICATIONS

Dr. Vaibhav Kumar, "A Hands-on Guide to Hybrid Ensemble Learning Models, With Python Code," Jul. 5, 2020, AIM, https://analyticsindiamag.com/a-hands-on-guide-to-hybrid-ensemble-learning-models-with-python-code/.

(Continued)

*Primary Examiner* — Stephen R Koziol
*Assistant Examiner* — Michael Kim Maiden
(74) *Attorney, Agent, or Firm* — James L. Olsen

(57) ABSTRACT

A method, system, and computer for balance weighted voting. The method may comprise receiving, by a network interface, a scoring request. The method may further comprise, by a processing unit in response to the scoring request, generating a plurality of scores using a plurality of models. normalizing the plurality of scores, calculating an evaluation-based weighting factor from a first subset of the normalized scores, calculating a prediction-based based weighting factor from a second subset of the normalized scores, and calculating a balanced weighting predictor from the evaluation-based weighting factor and the prediction-based weighting factor. The method may further comprise returning, by the network interface, the balanced weighting predictor as an ensemble score for the scoring request.

15 Claims, 6 Drawing Sheets

(56) References Cited

U.S. PATENT DOCUMENTS

| | | | |
|---|---|---|---|
| 10,902,005 | B2 | 1/2021 | Clinton |
| 2020/0012948 | A1 | 1/2020 | Tian |
| 2021/0117869 | A1 | 4/2021 | Plumbley |
| 2022/0122000 | A1* | 4/2022 | Li .................. G06F 18/2113 |
| 2023/0185882 | A1* | 6/2023 | Tian .................. G06N 20/20 |
| | | | 382/159 |

OTHER PUBLICATIONS

IBM SPSS Modeler, https://www.ibm.com/products/spss-modeler. Retrieved from internet on Oct. 21, 2021.

IBM Watson Studio, https://www.ibm.com/cloud/watson-studio. Retrieved from the internet on Oct. 21, 2021.

Jason Brownlee, "How to Combine Predictions for Ensemble Learning," Machine Learning Mastery, Updated Apr. 27, 2021, https://machinelearningmastery.com/combine-predictions-for-ensemble-learning/.

Jason Brownlee, "How to Develop a Weighted Average Ensemble With Python," Machine Learning Mastery, May 5, 2021, https://machinelearningmastery.com/weighted-average-ensemble-with-python/.

Kuncheva, Ludmila & Rodriguez, Juan. (2014). A weighted voting framework for classifiers ensembles. Knowledge and Information Systems. 38. 10.1007/s10115-012-0586-6. https://www.researchgate.net/publication/257482120.

Ren, F., Li, Y. & Hu, M. Multi-classifier ensemble based on dynamic weights. Multimed Tools Appl 77, 21083-21107 (2018). https://doi.org/10.1007/s11042-017-5480-5.

\* cited by examiner

BALANCE WEIGHTED VOTING

BACKGROUND

The present disclosure relates to predictive analytics, and more particularly to methods, systems, and computer program products for ensemble modeling with balance weighted voting.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the relatively higher performance of those capabilities, resulting in computer systems today that are more powerful than just a few years ago.

One application of these new capabilities is predictive analytics. Predictive analytics generally refers to a variety of statistical techniques, including data mining, predictive modelling, and machine learning. These techniques typically use models to analyze data and make predictions. An ensemble generally refers to a set of such models, with which each component model in the set formulating its own, independent predictions from input data. Ensembles attempt to produce more effective predictions than the respective component models.

SUMMARY

According to embodiments of the present disclosure, a method for balance weighted voting, comprising receiving, by a network interface, a scoring request. The method may further comprise, by a processing unit in response to the scoring request, generating a plurality of scores using a plurality of models. normalizing the plurality of scores, calculating an evaluation-based weighting factor from a first subset of the normalized scores, calculating a prediction-based based weighting factor from a second subset of the normalized scores, and calculating a balanced weighting predictor from the evaluation-based weighting factor and the prediction-based weighting factor. The method may further comprise returning, by the network interface, the balanced weighting predictor as an ensemble score for the scoring request. The method may further comprise selecting a preselected number of component models (Top N) from an ensemble model set. In some embodiments, the selecting comprises selecting at least one component model using an evaluation-measure before generating the plurality of scores, and selecting at least one component model using a prediction-measure after generating the plurality of scores.

A further aspect provides a computer program for implementing the method.

A further aspect provides a corresponding computer program product.

A further aspect provides a system for implementing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
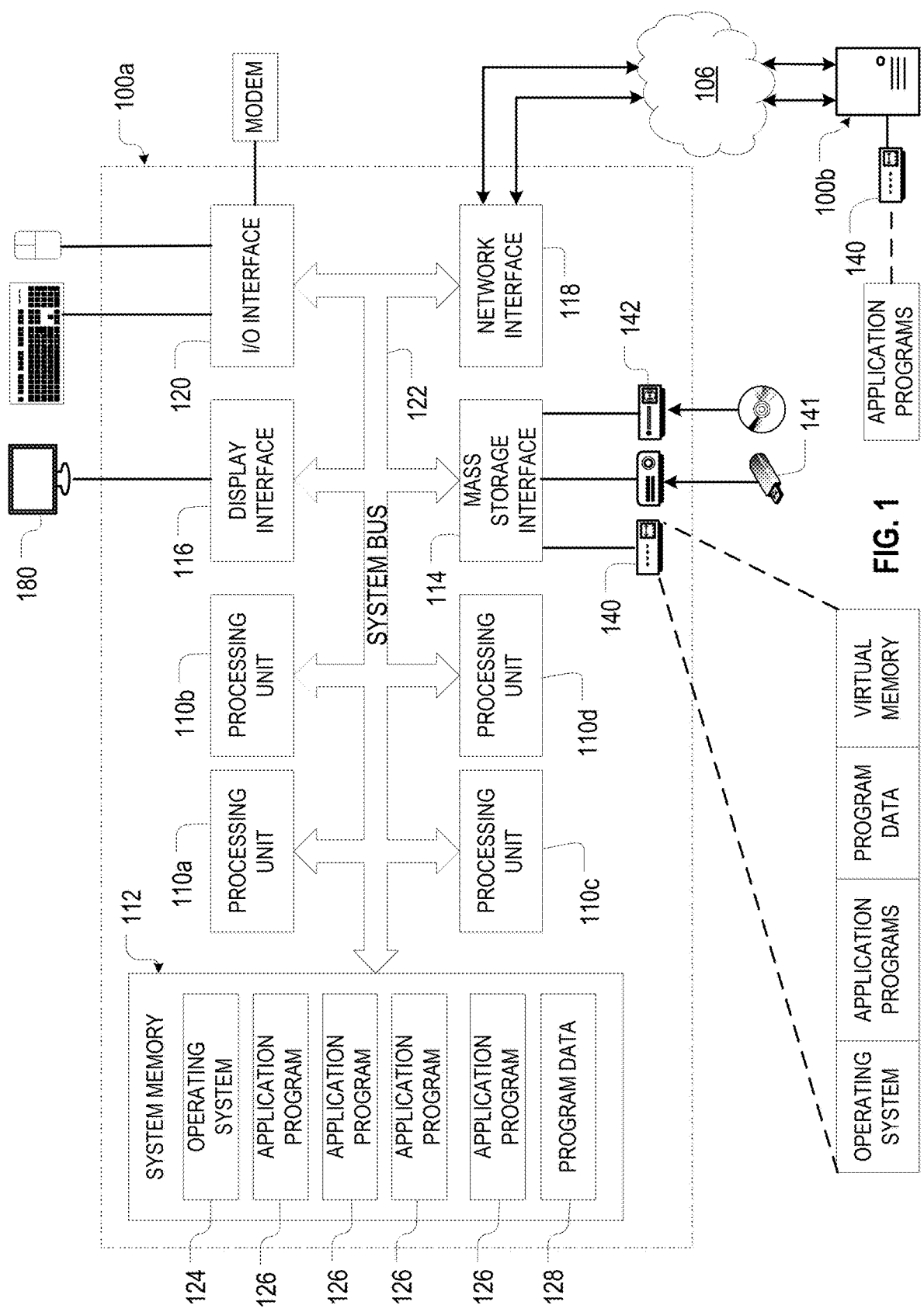
FIG. 1 illustrates one embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to predictive analytics, more particular aspects relate to methods, computer program products, and systems for ensemble modeling with balance weighted voting. While the present disclosure is not necessarily limited to such applications, various aspects of the disclosure may be appreciated through a discussion of various examples using this context.

In predictive analytics, an ensemble comprises a set of two or more component models, and more typically, a three or more component models. To generate a prediction using an ensemble, the component models and/or their outputs may be analyzed and/or combined into a single output (or score). Ensembles are often typically more effective than single predictive models, but their increased complexity means that they can take much more time and/or resources to produce an output. That is, by combining the component models formulating the respective relationships, an ensemble typically can formulate relationships more comprehensively than any individual model, and accordingly, can generate predictions that are more effective than any individual model. However, because the ensemble uses a plurality of component models to produce its output, ensemble scoring typically has a high demand on resources for computation and storage, as well a longer time lapse from receiving a request until producing the prediction.

Weighted voting generally refers to an approach to derive an ensemble score from the component models and/or component model outputs. Weighted voting may be particularly desirable for classification problems, such as anomaly detection in online transactions as occurring in real time, loan approval screening based on various financial data, and identifying promising drug candidates. Conventionally, there are two approaches to combine the outputs of component models within an ensemble: i) evaluation-measure based weighting, i.e., based on each component model's effectiveness; and (ii) prediction-measure based weighting, i.e., based on a confidence score for a particular prediction by each component model. Drawbacks with such conventional approaches include: (i) for evaluation-measure based weighting, focusing on model overall performance, but ignoring single record prediction effectiveness; and (ii) for prediction-measure based weighting, focusing on single record prediction effectiveness, but ignoring model overall performance.

Accordingly, some embodiments of this disclosure may include a method to balance evaluation-measure based weighting and prediction-measure based weighting. Two embodiments to calculate balanced weights are discussed in more detail below. Additionally or alternatively, some embodiments of this disclosure may provide a method to select a "Top N" number of models from an ensemble model set using hybrid nested weight filtering.

Table 1 contains an illustrative example for a weighted voting system single record ensemble scoring system, consistent with some embodiments:

TABLE 1

|  | Model effectiveness Prediction | Value Prediction | Confidence | Real Label |
|---|---|---|---|---|
| Model 1 | 0.9 | 1 | 0.6 | 0 |
| Model 2 | 0.85 | 0 | 1 | 0 |
| Model 3 | 0.8 | 0 | 1 | 0 |
| Model 4 | 0.75 | 1 | 0.8 | 0 |
| Model 5 | 0 | 1 | 0.7 | 0 |

In this illustrative example, a conventional ensemble using evaluation-measure based weighted voting would produce the following prediction:
Final Prediction=1 (wrong)
0.9+0.75+0.7 (2.35)>0.85+0.8 (1.65)
A conventional ensemble using prediction-measure based weighted voting would produce the following prediction:
Final Prediction=1 (wrong)
0.6+0.8+0.7 (2.1)>1+1 (2)
A balanced weighted voting (via multiplication) system consistent with some embodiments, in contrast, may produce:
Final Prediction=0 (correct)
0.9*0.6+0.75*0.8+0.7*0.7 (1.63)<0.85*1+08*1 (1.65)
In a first embodiment, an evaluation-based weight (EW) metric may be calculated as follows:

$$EW = \prod_{i=1}^{n} EW_i$$

where $EW_i$ may be a normalized evaluation measure to be considered by the balance weighted category described below. The normalized evaluation measure, in turn, generally refers to a class of techniques that scale data, enabling more easy comparison of that data. One suitable normalization technique is to rescale all the outputs of each component model to between 0 and 1 using the following formula:

$$x_{normalized} = \frac{x - x_{min}}{x_{max} - x_{min}}$$

In the first embodiment, a prediction-based weight (PW) may be calculated as follows:

$$PW = \prod_{i=1}^{n} PW_i$$

where $PW_i$ is a normalized prediction measure to be considered for each balance weighted category. Those skilled in the art will, however, appreciate that additional measures could be considered for each balance weighted category.

In a second embodiment, the evaluation-based weight (EW) metric may be calculated as follows:

$$EW = \prod_{i=1}^{n} EW_i * \alpha_i$$

where $EW_i$ may again be a normalized evaluation measure to be considered by a balance weighted category and $\alpha_i$ is related hyperparameter for $EW_i$. The hyperparameter, in turn, may be a tuning factor chosen by a creator of the ensemble, or may be a factor calculated by a machine learning model trained to optimize one or more factors, such as avoiding type-1 errors, avoiding type-2 errors, etc. A prediction-based weight (PW) in the second embodiment may be calculated as follows:

$$PW = \prod_{i=1}^{n} PW_i * \beta_i$$

where $PW_i$ is a normalized prediction measure to be considered for each balance weighted category and $\beta_i$ is a related hyperparameter for $PW_i$. As with the first embodiment, those skilled in the art will appreciate that more measures could be considered for each balance weighted category.

In both embodiments, two formats of a balance weight (BW) predictor may be calculated as follows:
1) BW=EW*PW, and
2) BW=θ*EW+(1−θ)*PW,
where θ is a related balance hyperparameter for BW.

One feature and advantage of embodiments using balance weighted voting is that more kinds of ensemble measures may considered. Thus, ensemble effectiveness may improve when measure distances among voting candidates (e.g., ensemble output) are not big (i.e., less than a predetermined threshold) via each single measure (e.g., component models).

Turning now to the figures:

Data Processing System (DPS)

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The DPS 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140, a USB drive 141, and/or a readable/writable optical disk drive 142. The network interfaces 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the DPS 100 may only comprise a single processor system and/or a single processor designed to emulate a multiprocessor system. Further, the processor(s) 110 may be implemented using a number of heterogeneous data processing systems in which a main processor 110 is present with secondary processors on a single chip. As another illustrative example, the processor(s) 110 may be a symmetric multiprocessor system containing multiple processors 110 of the same type When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard 181, mouse 182, modem 183, or printer (not shown)

The terminal/display interface 116 may be used to directly connect one or more displays 180 to the DPS 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the DPS 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
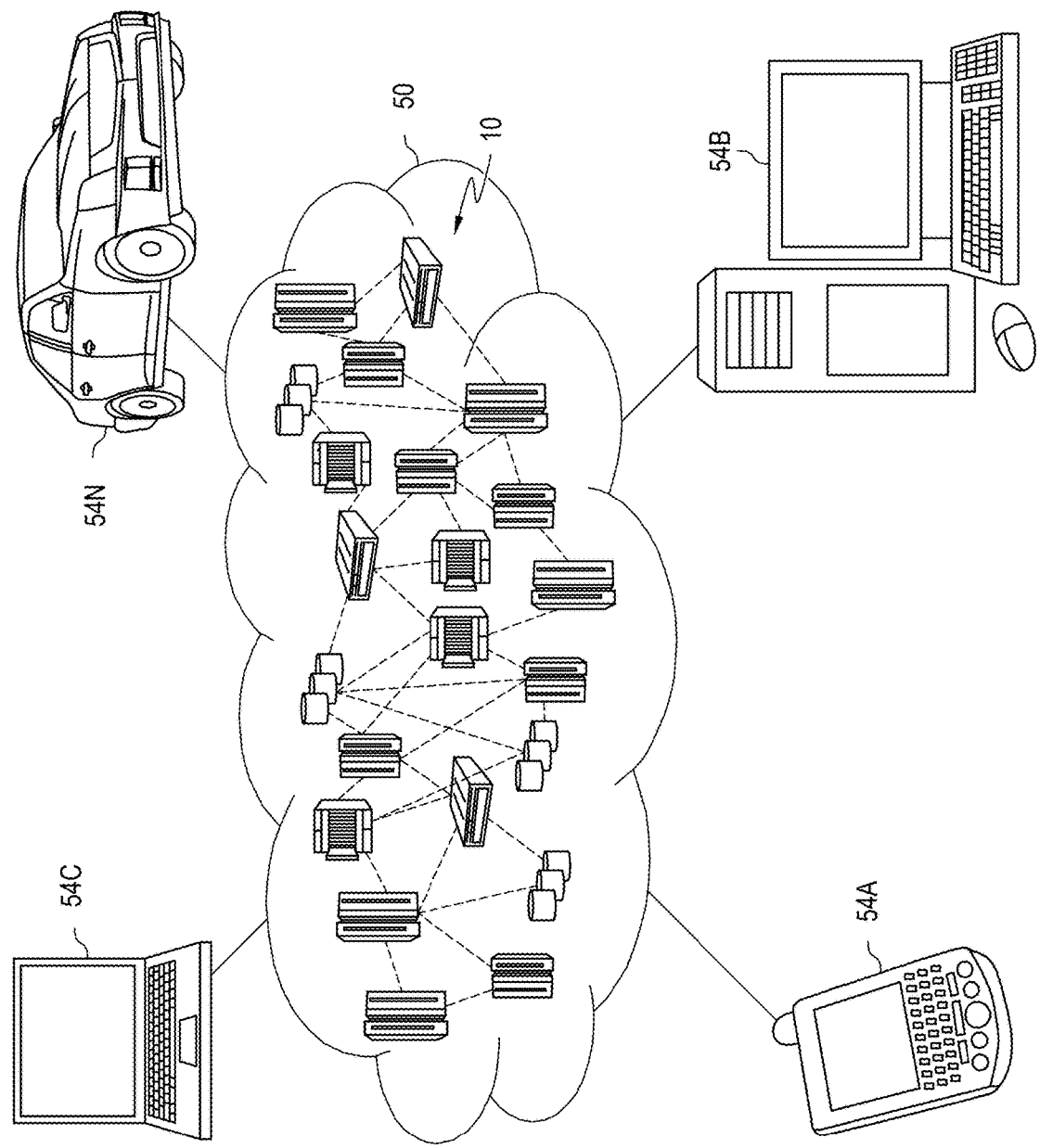
FIG. 2 illustrates one embodiment of a cloud environment suitable for an edge enabled scalable and dynamic transfer learning mechanism.

FIG. 2 illustrates one embodiment of a cloud environment suitable for enabling a predictive analytics system. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
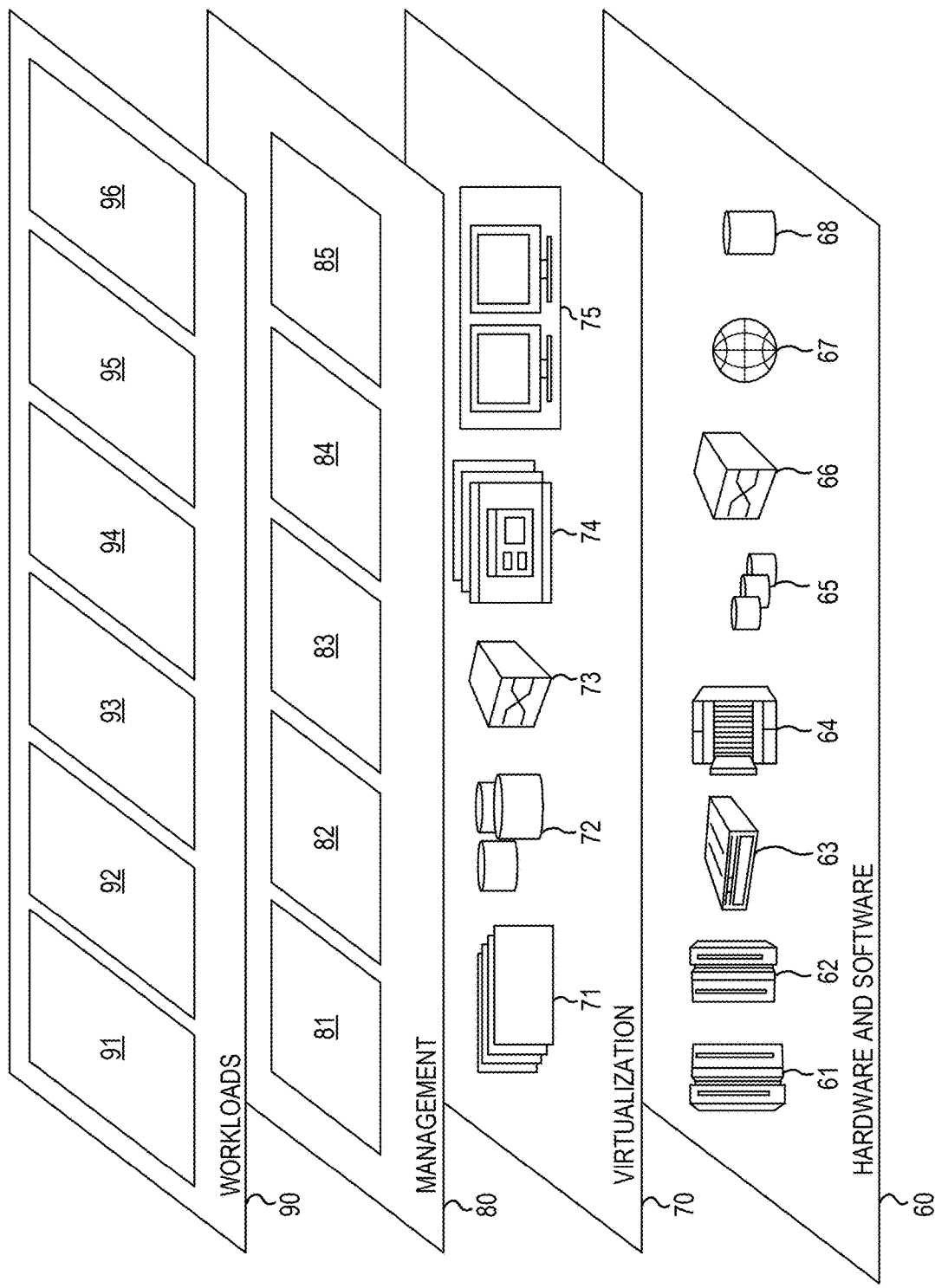
FIG. 3 shows a set of functional abstraction layers provided by a cloud computing environment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a predictive analytics subsystem 96.

Ensemble System

Figure 4:
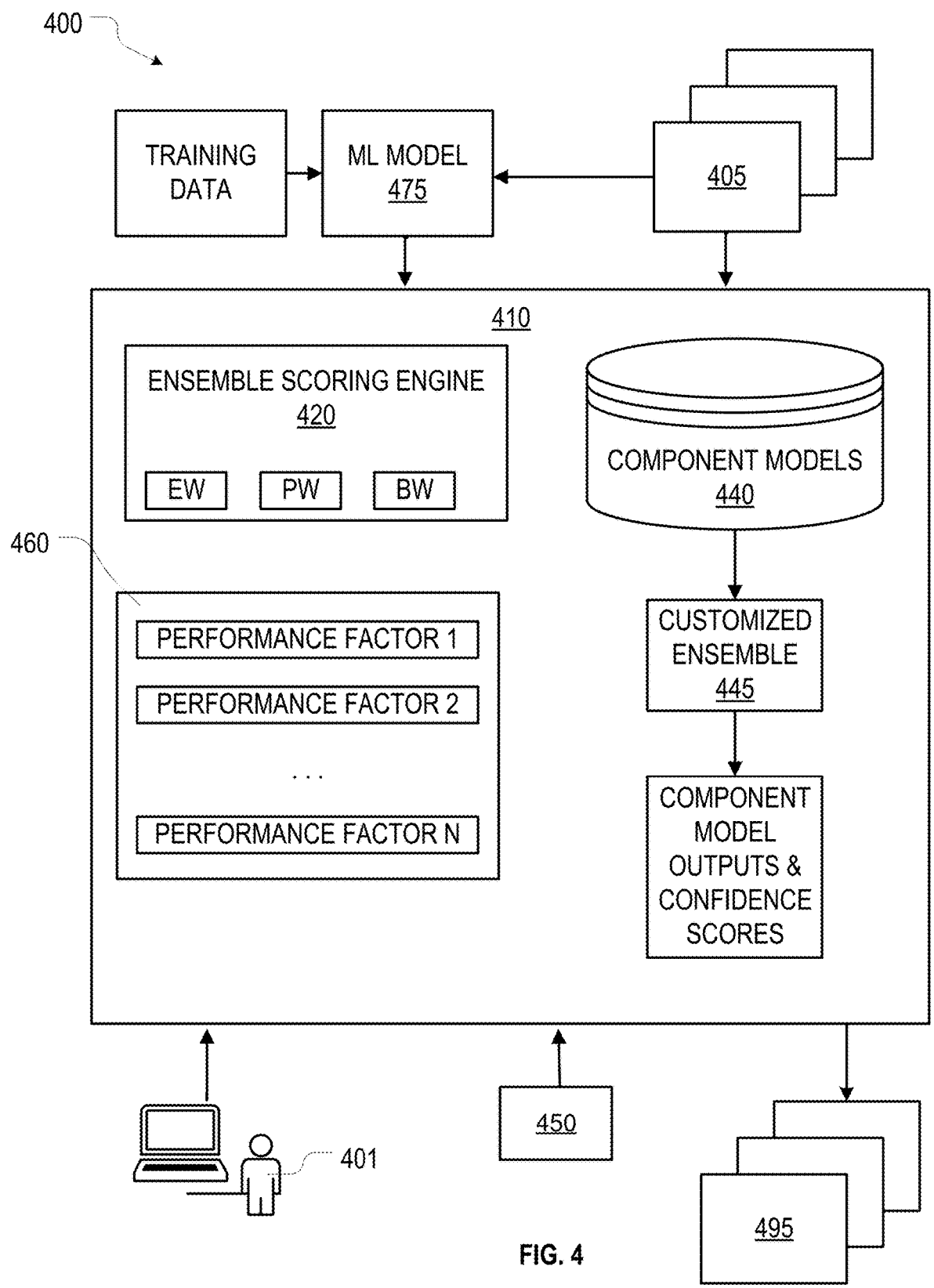
FIG. 4 depicts a system for ensemble modeling using balance weighted voting, in accordance with one or more embodiments set forth herein.

FIG. 4 depicts a system 400 for ensemble modeling using balance weighted voting, in accordance with one or more embodiments set forth herein. The system 400 may be enabled as part of the predictive analytics subsystem 96 described with reference to FIG. 3.

Embodiments of the present disclosure recognize that an ensemble may be utilized for predicting an output from input data in the context of a particular request. Prediction by the ensemble, also referred to as ensemble scoring, is often used in financial sectors, such as anomaly detection in online transactions as occurring in real time, a loan approval screening based on various financial data. Ensembles may also be used in the pharmaceutical industry, e.g., to identify drug candidates.

The individual component models of the ensemble may each make independent predictions from input data. By combining the predictions of the component models using balance weighted voting, the ensemble(s) disclosed herein may predict the output more effectively than conventional ensembles, which, in turn, may be more effective than any individual model in the ensemble. Additionally, some embodiments may allow for more kinds of ensemble measures to be considered.

The system 400 for ensemble modeling using balance weighted voting in FIG. 4 may include an ensemble scoring subsystem 410, which be adapted to process one or more real time scoring requests 405 (e.g., requests to generate and analyze data using an ensemble). The ensemble scoring subsystem 410, in turn, may include an ensemble scoring engine 420, a plurality of component models 440, and a prioritized list of configuration policies 460. The ensemble scoring subsystem 410 may produce one or more ensemble scores 495 in response to each request of the score request 405, which may include generating a custom ensemble, collecting scores from the component models, and combining the collected scores using balanced weight voting.

A user 401 may represent any human user, such as an administrator, during analysis of the component models 440 and/or while ensemble scoring. The user 401 may generate the prioritized list of configuration policies 460, providing inputs to the ensemble scoring subsystem 410, and/or receiving outputs from the ensemble scoring subsystem 410.

The prioritized list of configuration policies 460 may include a maximum number of component models to include in the ensemble, as well as a prioritized list of performance factors and threshold conditions to use when selecting and/or filtering component models 440 to form the customized ensemble. The custom ensemble 445 may be generated using the hybrid nested weight filtering described with reference to FIG. 5 according to the specified performance factors and threshold conditions identified in the prioritized list of configuration policies 460 and statistics 450 about the component models and/or the associated data processors.

In some embodiments, the one or more performance factors may be selected from group consisting of a model effectiveness score and a model confidence sore. The model effectiveness score, in turn, generally refers to the performance of the respective component model over time (i.e., not specific to any particular score request 405) in correctly predicting an output from input data. Model confidence, in turn, generally refers to an estimated probability of that a particular output of a particular component model in response to a particular sore request 405 will be correct. Those skilled in the art will recognize, however, that other performance factors and thresholds may be specified by the user 401, including a maximum response time, maximum CPU usage, maximum memory usage, maximum cost, physical location of the associated data processor, confidentiality guarantees of the associated data processor, etc. Additionally, the ensemble scoring subsystem 410 may include a user interface (not shown) and a corresponding interactive process by which the user 401 may specify the maximum number of component models, the performance factors, and threshold conditions.

The ensemble scoring subsystem 410 may generate various configuration and/or performance data 430 for each component model, such as an effectiveness score for component model, as well as performance metrics such as execution time, CPU usage, and memory usage of each component model. The ensemble scoring subsystem 410 may also query for various information about the each potential data processor.

As noted, performance factors and thresholds may be listed in a priority order. Consequently, the ensemble scoring engine 420 may first accesses the top priority performance factor and threshold to decide which component models 440 to select/filter to achieve the specified maximum number of component models 440, and then may continue on to the next highest priority performance factor and threshold, until that maximum number of component models 440 is achieved.

Figure 5A:
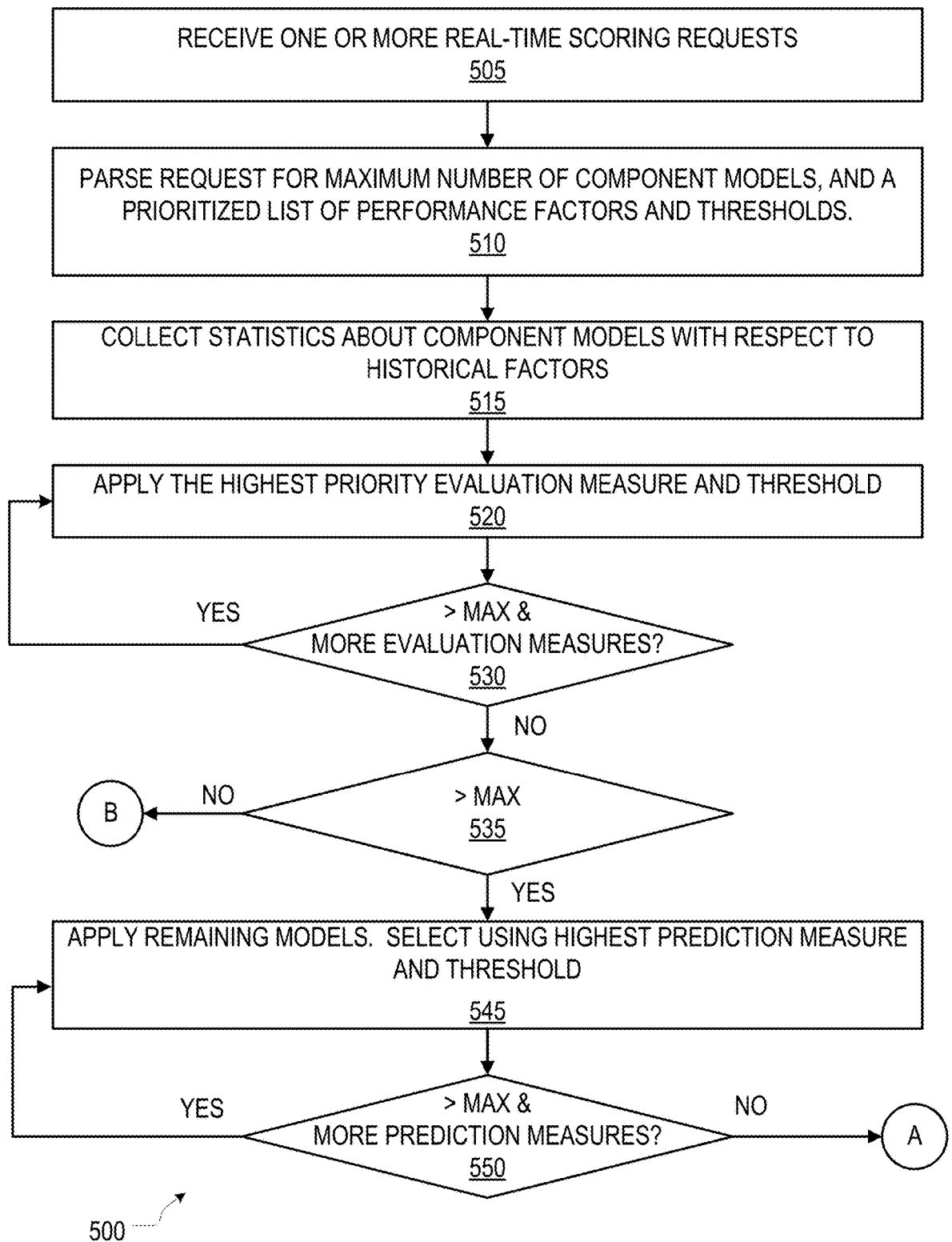
FIGS. 5A-5B (collectively FIG. 5) depicts a flowchart of operations performed by an ensemble scoring engine, in accordance with one or more embodiments set forth herein.
Figure 5B:
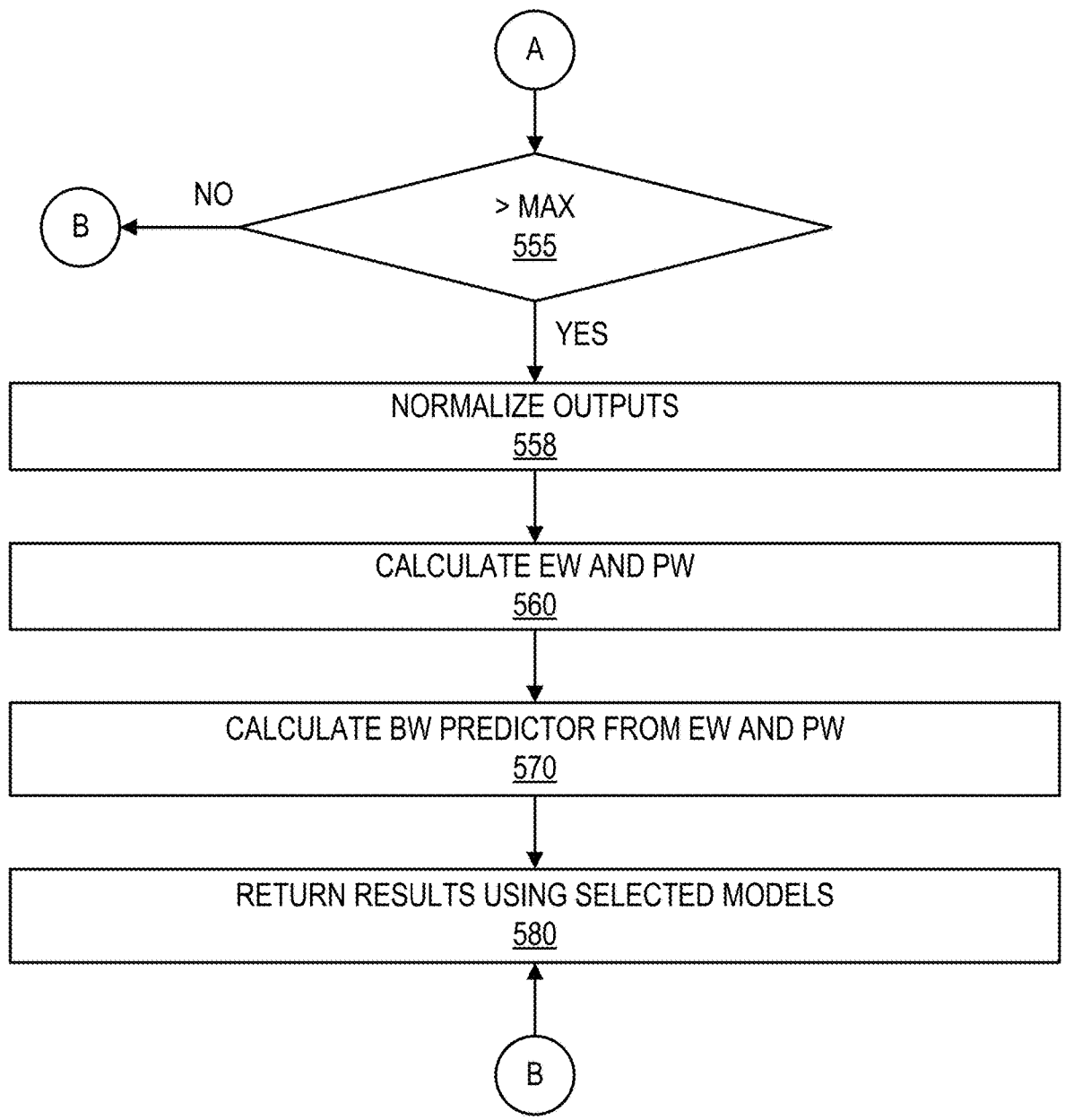

FIGS. 5A-5B (collectively FIG. 5) depicts a flowchart 500 of operations performed by the ensemble scoring engine 420, in accordance with one or more embodiments set forth herein.

In some embodiments, the number of potential component models in the list of component models 440 may be greater than the user 401 wishes to use. Accordingly, the ensemble scoring engine 420 in some embodiments may use the specified maximum number of component models, the performance factors, and threshold conditions to generate a customized ensemble. This may include selecting a subset of component models from the list of component models 440 that optimally satisfy the conditions specified by the user 401. In this way, some embodiments of the ensemble scoring engine 420 may enable a customized ensemble 445, which, in turn, may improve overall efficiency in resource usage and response time of conventional ensemble scoring, without compromising effectiveness of resulting prediction.

At operation 505, the ensemble scoring engine 420 may receive one or more real-time scoring requests. Examples of the real-time scoring request can include, but are not limited to, anomaly detection in online transactions, a loan approval screening, a credit score calculation, drug candidate identification, or the like. At operation 510, the ensemble scoring engine 420 may parse the request for a maximum number of component models to use in the ensemble, as well as a prioritized list of performance factors and thresholds. The ensemble scoring engine 420 may use these specifications to automatically build the customized ensemble 445. This information may be specified by the user 401, or may be generated by a trained machine learning model 475 using details of the scoring request 405. As an illustrative example of a multiple classifier case, if the target field is identifying drug candidates e.g., [$drug_A$, $drug_B$, $drug_C$, ... $drug_X$, $drug_Y$], user 401 may specify input measure constraints as follows:

1) effectiveness ($drug_A$)>0.97;
2) Overall effectiveness>0.8;
3) Confidence ($drug_A$)>0.9; and
4) Confidence (non-drugA)>0.75

At operation 515, statistics about all of the component models in the list of component models 440 may be collected with respect to any historical factors (e.g., model effectiveness) among the selected performance factors. At operation 520, the ensemble scoring engine 420 may apply the highest priority evaluation measure and threshold from the list of performance factors to select a first subset of component models 440 (e.g., by filtering component models that do not satisfy the performance factor). Operation 530 determines whether or not any evaluation measures remain and if the subset should be further reduced (i.e., less than a predetermined maximum number of models MAX). If both are true, then ensemble scoring engine 420 may return to operation 520 and apply the next highest evaluation measure performance factor (if any), otherwise the ensemble scoring engine 420 may proceed to operation 535. If MAX has been achieved, then the ensemble scoring engine 420 may proceed to process the current score request 405 at operation 580 using the selected models.

If MAX has not been achieved and if no evaluation measure performance factors remain in the prioritized list, the ensemble scoring engine 420 may proceed to evaluate, or partially evaluate, the real-time scoring request 405 using the remaining component models at operation 545. The ensemble scoring engine 420 may also collect prediction measures from each of the remaining component models at operation 545. The ensemble scoring engine 420 may then use the highest priority prediction measure performance factor to further select/filter the component models. At operation 550, the ensemble scoring engine 420 may determine whether or not the current subset is less than MAX and additional component models remain. If so, then ensemble scoring engine 420 may return to operation 545 and apply the next highest prediction measure performance factor, otherwise the ensemble scoring engine 420 may proceed to operation 555.

The subset output from operations 515-550 contains a reduced number of component models. At operation 555, the ensemble scoring engine 420 determines if additional filtering is required. If the number of models is less than or equal to MAX, i.e., the top-N models have been selected and further operations are not needed, then the ensemble scoring engine 420 may proceed to process the current score request 405 at operation 580. Otherwise, the ensemble scoring engine 420 may calculate a final ensemble prediction of the remaining component models' outputs at operations 558-570. This may include normalizing the output of each remaining model's output at operation 558. Next, the ensemble scoring engine 420 may calculate EW at operation 560 as the geometric sum of the normalized evaluation factors, and calculate PW as the geometric sum of the normalized performance factors. Optionally, each models' output may be weighted by a hyperparameter $\alpha$ or $\beta$ in some embodiments. These hyperparameters may be assigned by the user 401, or may be generated by a machine learning model trained to optimize model effectiveness. At operation 570, the ensemble scoring engine 420 may calculate the BW predictor from the EW and PW terms. Two embodiments of the BW predictor may be defined as follows: (i) BW=EW*PW; and BW=$\theta$*EW+(1−$\theta$)*PW, where $\theta$ is a related balance hyperparameter for BW. Like $\alpha$ or $\beta$, $\theta$ may be assigned by the user 401, or may be generated by a machine learning model (ML) trained to optimize model effectiveness.

At operation 580, the ensemble scoring engine 420 may use the BW predictor to further reduce the number of remaining component models to be less than or equal to MAX (N), i.e., so that the top N models are selected. Then, the top N models may be used to complete the prediction for the current real time score request 405. Then, the ensemble scoring engine 420 may terminate processing of the current score request 405.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a subsystem, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A method comprising:
receiving a scoring request;
generating, by a machine learning model and based on the scoring request, a list of performance factors and corresponding performance thresholds for selecting a subset of component models of a plurality of component models to include within an ensemble model for responding to the scoring request;
selecting the subset of component models from the plurality of component models by determining that historical performance of respective ones of the component models of the subset of component models satisfy the performance thresholds corresponding to the performance factors within the list;
generating a plurality of scores using the subset of component models;
normalizing the plurality of scores;
calculating an evaluation-based weighting factor from a first subset of the normalized scores;
calculating a prediction-based weighting factor from a second subset of the normalized scores;
calculating a balanced weighting predictor from the evaluation-based weighting factor and the prediction-based weighting factor; and
returning the balanced weighting predictor as an ensemble score for the scoring request.

2. The method of claim 1, wherein the evaluation-based weighting factor comprises an effectiveness score for each component model.

3. The method of claim 1, wherein the prediction-based weighting factor comprises a confidence level generated by each component model.

4. The method of claim 1, wherein calculating a balance weighting predictor comprises calculating a geometric sum of the evaluation-based weighting factor and the prediction-based weighting factor.

5. The method of claim 1, wherein the ensemble model comprises a plurality of classifiers.

6. The method of claim 5, wherein the scoring request further comprises a plurality of input measure constraints, wherein each of the plurality of classifiers is associated with at least one of the plurality of input measure constraints.

7. The method of claim 6, further comprising applying the ensemble score to identify a drug candidate from a field of drug candidates.

8. A computer system comprising:
a processor set;
one or more computer-readable storage media; and
program instructions stored on the one or more computer-readable storage media to cause the processor set to perform operations comprising:
receiving a scoring request;
generating, by a machine learning model and based on the scoring request, a list of performance factors and corresponding performance thresholds for selecting a subset of component models of a plurality of component models to include within an ensemble model for responding to the scoring request;
selecting the subset of component models from the plurality of component models by determining that historical performance of respective ones of the component models of the subset of component models satisfy the performance thresholds corresponding to the performance factors within the list;
generating a plurality of scores using the subset of component models;
normalizing the plurality of scores;
calculating an evaluation-based weighting factor from a first subset of the normalized scores;
calculating a prediction-based weighting factor from a second subset of the normalized scores;
calculating a balanced weighting predictor from the evaluation-based weighting factor and the prediction-based weighting factor; and
returning the balanced weighting predictor as an ensemble score for the scoring request.

9. The system of claim 8, wherein the evaluation-based weighting factor comprises an effectiveness score for each component model.

10. The system of claim 8, wherein the prediction-based weighting factor comprises a confidence level generated by each component model.

11. The system of claim 8, wherein calculating a balance weighting predictor comprises calculating a geometric sum of the evaluation-based weighting factor and the prediction-based weighting factor.

12. A computer program product comprising:
one or more computer-readable storage media; and
program instructions stored on the one or more computer-readable storage media to perform operations comprising:
receiving a scoring request;
generating, by a machine learning model and based on the scoring request, a list of performance factors and corresponding performance thresholds for selecting a subset of component models of a plurality of component models to include within an ensemble model for responding to the scoring request;
selecting the subset of component models from the plurality of component models by determining that historical performance of respective ones of the component models of the subset of component models satisfy the performance thresholds corresponding to the performance factors within the list;
generating a plurality of scores using the subset of component models;
normalizing the plurality of scores;
calculating an evaluation-based weighting factor from a first subset of the normalized scores;
calculating a prediction-based weighting factor from a second subset of the normalized scores;
calculating a balanced weighting predictor from the evaluation-based weighting factor and the prediction-based weighting factor; and
returning the balanced weighting predictor as an ensemble score for the scoring request.

13. The computer program product of claim 12, wherein:
the evaluation-based weighting factor comprises an effectiveness score for each component model; and
the prediction-based weighting factor comprises a confidence level generated by each component model.

14. The computer program product of claim 12, wherein calculating a balance weighting predictor comprises calculating a geometric sum of the evaluation-based weighting factor and the prediction-based weighting factor.

15. The method of claim 1, wherein selecting the subset of component models from the plurality of component models to include within the ensemble model further comprises:
   collecting a prediction-measure from each component model of the plurality of models; and
   comparing the prediction-measure of each component model to a prediction threshold, wherein the subset of component models is selected based on respective component models within the subset of component models satisfying the performance thresholds corresponding to the performance factors within the list and based on respective component models within the subset of component models having a prediction-measure satisfying the prediction threshold.

* * * * *